United States Patent [19]
Johari et al.

[11] Patent Number: 6,062,076
[45] Date of Patent: May 16, 2000

[54] ULTRASONIC MONITORING METHOD AND SYSTEM FOR WAKE TURBULENCE USEFUL AT RUNWAYS

[75] Inventors: Hamid Johari, Worcester; William W. Durgin, Holden, both of Mass.

[73] Assignee: Worchester Polytechnic Institute, Worchester, Mass.

[21] Appl. No.: 09/090,074

[22] Filed: Jun. 3, 1998

Related U.S. Application Data

[60] Provisional application No. 60/048,448, Jun. 3, 1997.

[51] Int. Cl.$^7$ .............................. G01F 13/00; G01S 15/00
[52] U.S. Cl. ........................ 73/170.13; 367/94; 340/949; 340/968
[58] Field of Search ........................ 73/597, 627, 170.11, 73/170.13, 170.01, 170.02, 489; 367/93, 94; 340/947, 948, 949, 951, 968; 342/26

[56] References Cited

U.S. PATENT DOCUMENTS

| | | | |
|---|---|---|---|
| 3,671,927 | 6/1972 | Proudian et al. | 340/1 R |
| 3,889,533 | 6/1975 | Balser | 73/189 |
| 4,336,606 | 6/1982 | Heard | 367/117 |
| 4,432,237 | 2/1984 | Schmidt et al. | 73/632 |
| 4,493,217 | 1/1985 | Engler et al. | 73/861 |
| 4,831,874 | 5/1989 | Daubin et al. | 73/189 |
| 5,262,773 | 11/1993 | Gordon | 340/968 |
| 5,309,100 | 5/1994 | Song et al. | 324/306 |
| 5,343,744 | 9/1994 | Ammann | 73/170.13 |
| 5,550,789 | 8/1996 | Silverstein | 367/94 |

OTHER PUBLICATIONS

H. Johari, et al., "Ultrasound Methods for Direct Measurement of Circulation," 49th Annual Meeting of APS/DFD, Mechanical Engineering Department, Worcester Polytechnic Institute, Worcester, MA (Nov. 25, 1996).

R.H. Smith, et al., "The Direct Measurement of Circulation in Free Surface Vortices," AIAA 95–0104, 33rd Aerospace Sciences Meeting and Exhibit, Worcester Polytechnic Institute, Worcester, MA (Jan. 9–12, 1995/Reno, NV).

F.J. Weber, et al., "The Circulation Measurements About a Rapidly Pitching Airfoil Using an Ultrasonic System," AIAA 95-2269, 26th AIAA Fluid Dynamics Conference (Jun. 19–22, 1995/San Diego, CA).

J. Moreira, et al., "Direct Measurement of Delta Wing Vortex Circulation Using Ultrasound," AIAA 97–0743, 35th Aerospace Sciences Meeting & Exhibit, Worcester Polytechnic Institute, Worcester, MA (Jan. 6–10, 1997/Reno, NV).

"Aircraft Wake Vortices: A State–of–the–Art Review of the United States R&D Program," Report No. FAA–RD–77–23, U.S. Department of Transportation, Federal Aviation Administration, Systems Research and Development Service, Washington, D.C. 20591, Final Report (Feb., 1977).

E. A. Thomson, "Experiment Will Use Sound Pulses to Probe Tidal Mixing," *MIT Tech Talk*, p. 6 (May 15, 1996).

H. Johari, et al., "Ultrasound Methods for Direct Measurement of Circulation," Abstract for Experimental Techniques, *Bull. of the American Physical Society*, vol. 41, No. 9, p. 1764 (1996).

*Primary Examiner*—Hezron Williams
*Assistant Examiner*—Helen C. Kwok
*Attorney, Agent, or Firm*—Hamilton, Brook, Smith & Reynolds, P.C.

[57] ABSTRACT

Two techniques for detecting vortices and their associated circulation are disclosed. The first is termed a closed path configuration, and the second is termed the dual path configuration. These techniques are useable for the detection of wake turbulence especially in the vicinity of airport runways, which results from wing tip vortices generated by aircraft during take-off and landing. The systems are similar in that they use ultrasonic measurement techniques to determine the circulation about defined areas. The circulation is reflective of the vorticity associated with trailing vortices, which are manifest within the area.

37 Claims, 10 Drawing Sheets

$\Delta T = 0$ $\Delta T > 0$
SMALL +VE VALUE $\Delta T \gg 0$
LARGE +VE VALUE $\Delta T \rightarrow 0$

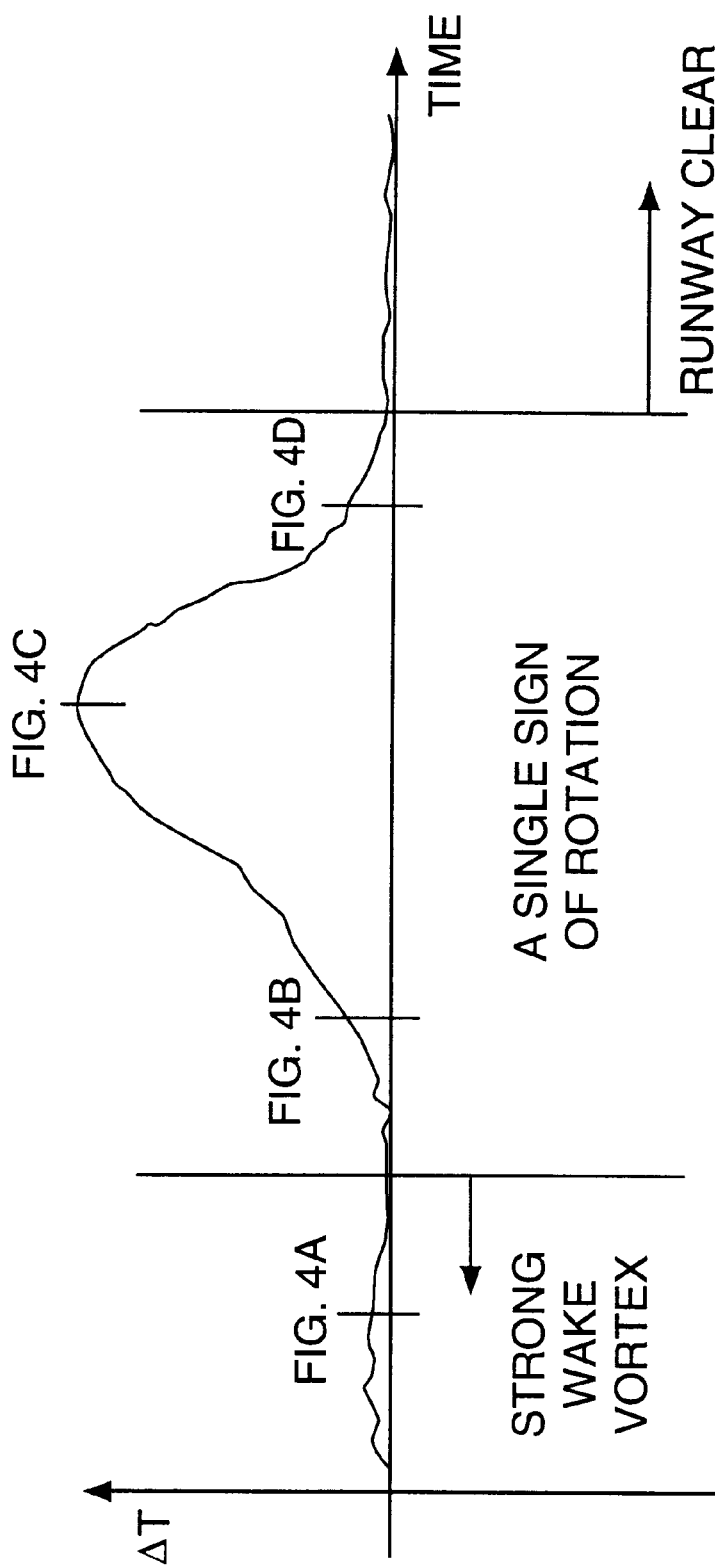

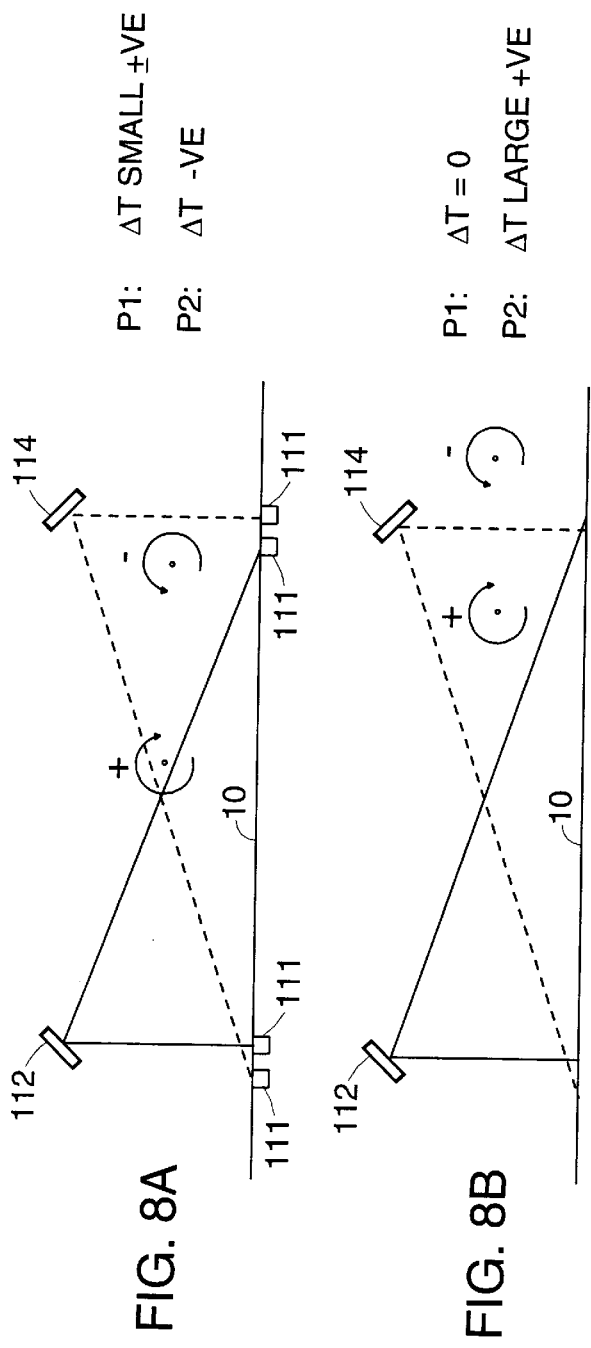
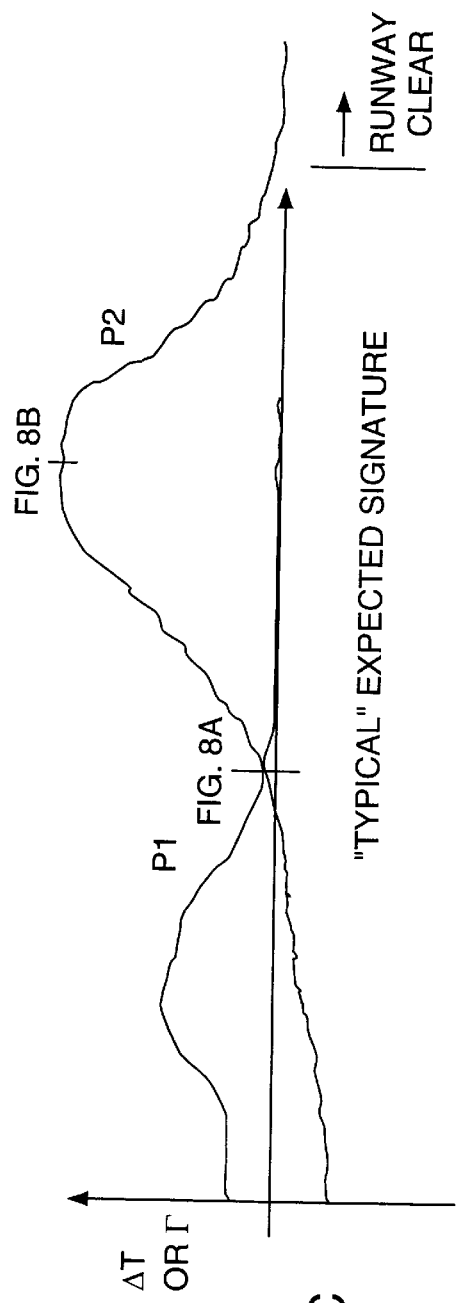
FIG. 8A
FIG. 8B
FIG. 8C

ULTRASONIC MONITORING METHOD AND SYSTEM FOR WAKE TURBULENCE USEFUL AT RUNWAYS

RELATED APPLICATION

This application claims priority from U.S. Provisional Patent Application Ser. No. 60/048,448, Jun. 6, 1997, the entire teachings of which are incorporated herein by this reference.

BACKGROUND OF THE INVENTION

The traveling vortex system generated by an aircraft constitutes the principal ingredient to wake turbulence at airports. Typically, twin, counter-rotating vortices originate from the wings of the aircraft, near the wing tips. The rotational air flows are capable of upsetting, damaging, or causing loss of control to other aircraft. The problem is most acute in the airport environment, especially when successive planes are taking-off and landing on the same runway or adjacent runways.

Airport runway usage procedures have been established to minimize the threats to safety from wake turbulence. Minimum separations are used for aircraft on the same runway or runways, which are near to each other. The safety specifications limit the takeoff and/of landing rates.

The spacings required by these regulations are tied to the worst-case dissipation of the vortexes. The separation times are typically on the order of two minutes. This is related to the time it takes the vortices produced by an airplane to be substantially dissipated such that they will not harm a subsequent airplane on the runway, even if it is much lighter, and smaller, than the preceding plane.

These separation times, however, are maintained even though the vortices may have been blown clear of the runway by crosswinds, for example. The separation times must be maintained because there is no knowledge of vortex position.

Systems have been proposed that utilize ultrasound to detect wing-generated vortices. Ultrasonic-based systems have a number of advantages including a well understood core technology, and that existing ultrasonic transducers can be located on the airport runway and survive the associated environmental extremes of temperature and moisture.

SUMMARY OF THE INVENTION

The proposed ultrasonic-based systems for monitoring wake turbulence suffer from either or both of two problems. First, they are inaccurate and cannot well measure the position and/or size/intensity of vortices surrounding the runway. Moreover, other systems are extremely complex and rely on laser systems, for example, to detect the ultrasonic signals after they have propagated through a region of interest.

The present invention is directed to two techniques for detecting vortices and their associated circulation. The first is termed a closed path configuration, and the second is termed the dual path configuration. These techniques are useful for the detection of wake turbulence especially in the vicinity of airport runways, which results from wingtip vortices generated by aircraft during take-off and landing. It will be appreciated, however, that the systems are also applicable to vortex detection at or near structures, such as buildings or stadiums, or other vehicles, such as large trucks or boats, including sailboats. The systems are similar in that they use ultrasonic measurement techniques to determine the circulation about defined areas. The circulation is reflective of the vorticity associated with trailing vortices, which are manifest within the area.

In general, according to one aspect, the invention features a system for detecting airplane wake turbulence at a runway. The system utilizes what is termed the closed path technique. Specifically, it comprises at least one ultrasonic generator. At least one substantially closed path is defined by at least one ultrasonic reflector. The path surrounds a region possibly containing wake turbulence, around which ultrasonic signals from the generator are transmitted. At least one ultrasonic detector is then used to detect the signals that have traveled the closed path. Based upon the travel times around the closed path, a system controller predicts the existence of wake turbulence in the region.

In specific embodiments, the substantially closed path has a leg incorporating the runway or ground. As a result since this leg is coincident with a solid boundary, velocity is zero and the ultrasonic signals do not need to traverse this leg.

Alternatively, however, the generator and detector may be essentially collocated to perform a complete closed path analysis.

Preferably, the closed path extends perpendicularly or at an angle relative to the centerline of the runway and encloses a region of the airspace above the runway. This allows the system to detect vortices generated by the wingtips of airplanes taking-off or landing on the runway.

At least two ultrasonic generators and transducers can be used to transmit ultrasonic signals in both directions around the substantially closed path. Usually, the region is triangular with the detector and generator being located at or near ground level and a reflector positioned above the runway for transmitting the signals between the detector and generator.

In other embodiments, at least two closed paths are defined by at least two ultrasonic reflectors surrounding two regions. These two substantially closed paths are preferably centered on either side of the runway and enclose a cross-section of the airspace above the runway. The regions may or may not be overlapping.

Further, sometimes a wind detector useful to sense wind direction so that the system controller has additional information as to how the vortices will move relative to the runway and relative to other runways.

In general, according to another aspect, the invention also features a system for detecting airplane wake turbulence. This second system, however, uses what is termed the two-path approach. Specifically, at least four ultrasonic transducers are used to detect and generate ultrasonic signals propagating in both directions along at least two paths, which are displaced with respect to each other. A system controller is then used to control the transducers and predict the existence of wake turbulence in response to the travel times for the ultrasonic signals in both directions over the two paths.

In specific embodiments, the system controller is able to determine a center of the wake turbulence in a region by reference to the travel times. The two paths can be located on either side of the runway. In the preferred embodiment, however, four paths are used, two on either side of the runway.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings:

FIG. 4E shows the Δt or circulation as a function of time recorded by the system controller based on the response from the detectors of the vortex detection system of FIGS. 3A and 3B with the crosswind shown in FIGS. 4A–4D;

FIG. 8A and 8B show the progress of the vortices at successive time intervals, assuming a crosswind relative to the inventive vortex detection system of FIG. 7;

FIG. 8C is a plot of Δt as a function of time for the vortex detection system of FIG. 7 with the crosswind shown in FIGS. 8A and 8B;

DETAILED DESCRIPTION OF THE PREFERRED EMBODIMENTS

The trailing vortices from airplanes contain compact regions v of intense vorticity. This is, in fact, the cause of the rotating flow. It is possible to determine the amount of vorticity through a related measure, termed circulation. Circulation is determined by the line integral:

$$\Gamma = \oint V dl$$

where dl is the small length element along the path. Equivalently:

$\Gamma = \int_A w dA$ where A is the area enclosed by the path, dA is an infinitesimally small element of area enclosed by the path, and w is the vorticity at the location.

The line integral can be carried out mechanically using sound propagation along the path. The path of sound determines the line and the velocity is automatically resolved into the path direction. The degree to which the sound propagation time is lengthened or shortened in one circuit of the path is a direct measure of the circulation.

Figure 1:
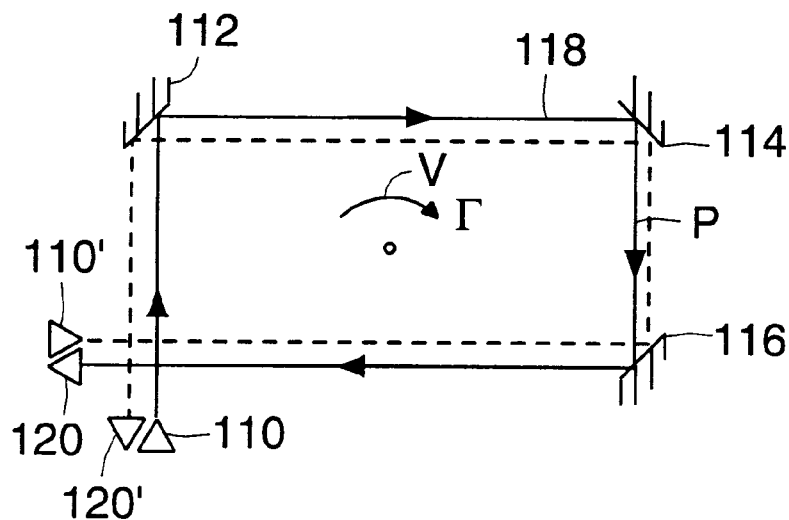
FIG. 1 is a schematic diagram showing a system for closed path vortex detection according to the present invention.

FIG. 1 shows a closed path vortex detection system, which implements features of the present invention. Source 110 generates the ultrasonic signal and reflectors 112, 114, 116 guide the signal 118 around the closed path P surrounding the vortex v to reach the receiver 120.

Since the speed of sound may vary as, for example, due to pressure, or temperature, it is beneficial to transmit ultrasound in both directions simultaneously. Such a modification is made to the FIG. 1 embodiment by adding a generator 110' near detector 120 and a detector 120' near generator 110 and using reflectors 112, 114 to guide the signals going in both directions. In one direction, the sound speeds up while in the other direction it slows down due to the air flow associated with the vortex. The net result for the circulation is independent of the speed of sound and hence temperature.

$$T_{1\to 2} = T_{counter\ clockwise} = \oint \frac{dl}{c - V_{vortex}}$$

$$T_{2\to 1} = T_{clockwise} = \oint \frac{dl}{c + V_{vortex}}$$

$$\Delta T = T_{1\to 2} - T_{2\to 1} = 2\oint \frac{V/c^2}{1-(V/c)^2} ds$$

if $(v/c) \ll 1$, say $0.1 \to 1-(v/c)^2 \geq 0.9$ $$\Delta T = \frac{2}{c^2}\oint v ds = \frac{2\Gamma}{c^2} \to \Gamma = \frac{1}{2}c^2 \Delta T$$

The sound speed is found using the sum of the two transit times such that:

$$\sum T = \frac{2L}{c} \to c = \frac{2L}{\sum T}$$

L is the total sound path $$\to \Gamma = \frac{1}{2}c^2\Delta T = 2\left[\frac{L}{\sum T}\right]^2 \Delta T$$

Figure 2:
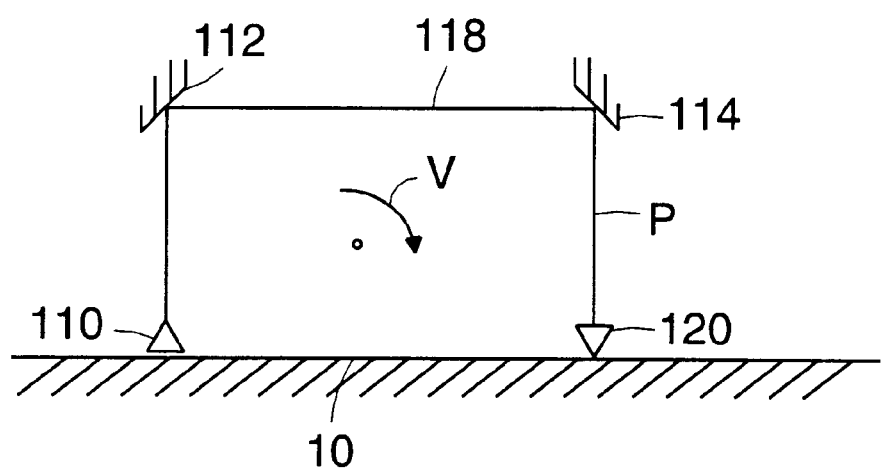
FIG. 2 is a schematic diagram showing an inventive vortex detection system using a substantially closed path.

FIG. 2 is a schematic diagram showing vortex detection along a substantially closed path P surrounding a vortex. When a portion of a path is coincident with a solid boundary, runway 10, then the velocity is zero and there is no contribution to the integral. This fact can be used to simplify the detection scheme by not requiring a fill path.

The main advantage of the closed path technique generally is that it does not assume any prior knowledge regarding the vortex or its location, as long as the closed path is large enough to cover the possible areas where the vortex may exist. The ground acts as the third segment closing the path. One or two pairs of ultrasound transducers as well as at least one reflector 112, 114 for each pair are needed in the arrangement shown. The reflector has to be mounted on top of a pole on the side of runway. If two pairs of transducers are utilized, they would be closely spaced and each transmitter/receiver pair only fires in one direction (cw or ccw). On the other hand, if only one pair is used, the transmitter/receiver pair has to fire alternatively in the cw and ccw directions to get the two travel times of $t_1$ and $t_2$ respectively. The difference between these two times, $\Delta t$, provides the circulation if the local sound speed is known.

Figure 3A:
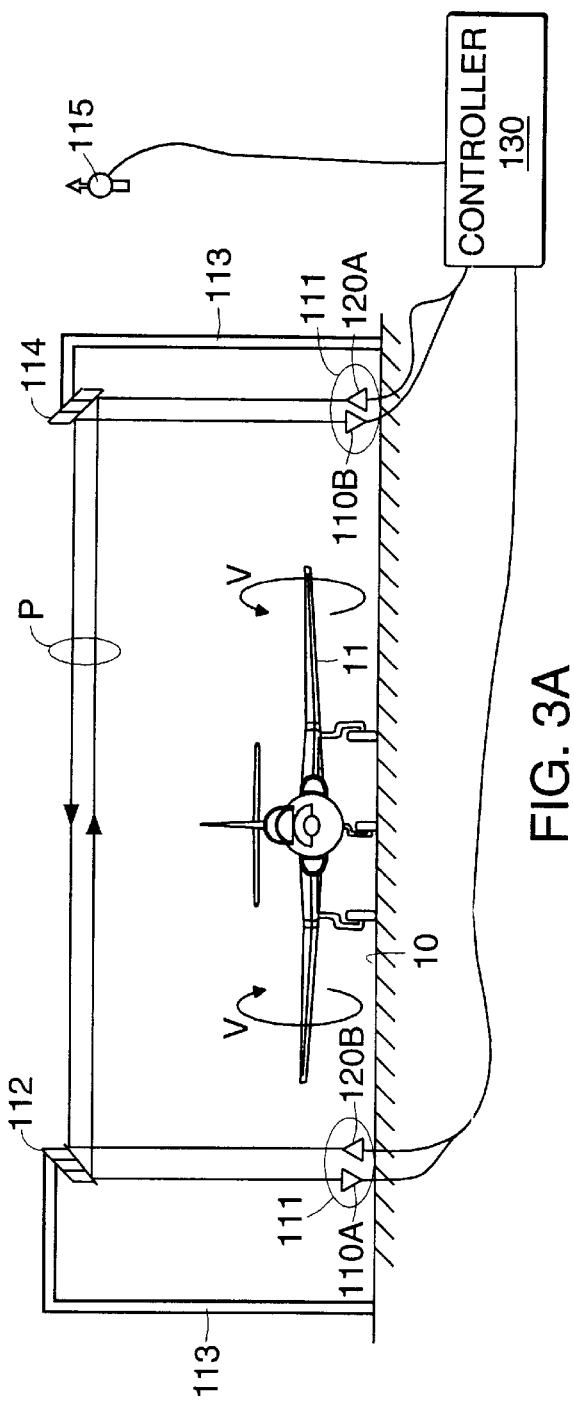
FIG. 3A is a schematic diagram illustrating deployment of the inventive vortex detection system at an airport runway to detect vortices generated by a plane at its wingtips.

FIG. 3A is a schematic diagram illustrating the deployment of a vortex detection system at an airport runway according to the present invention. Specifically, a plane 11 traveling down the runway 10 generates vortices v at its wing tips. These vortices will rotate counter to each other. The plane passes through a region surrounded by path P and defined by an ultrasonic generators 110A 110B. ultrasonic detectors 120A, 120B, and two ultrasonic reflectors 112, 114. (The combination of a detector and generator is referenced by number 111.) The reflectors are supported on poles 113.

Figure 3B:
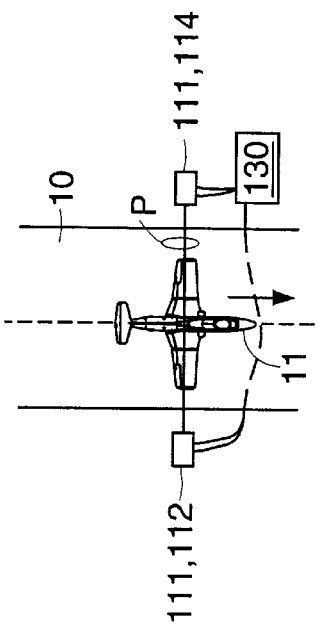
FIG. 3B is a top plan view of the inventive vortex detection system.

As shown in FIG. 3B, in order to maximize the sensitivity to the wing tip vortices, the path P is at least partially perpendicular to the axis of the runway 10 and the direction of the airplane's travel. However, the path P could be angled at an acute angle relative to the runway's axis.

Figure 4A:
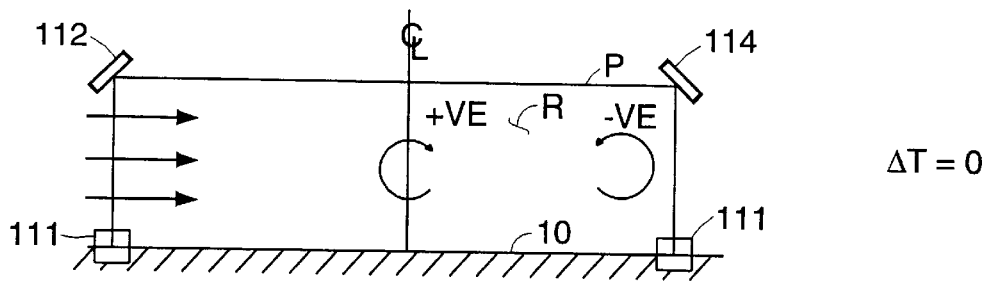
FIGS. 4A–4D show the movement of the vortices due to a crosswind at successive time intervals relative to the vortex detection system of FIGS. 3A and 3B.
Figure 4B:
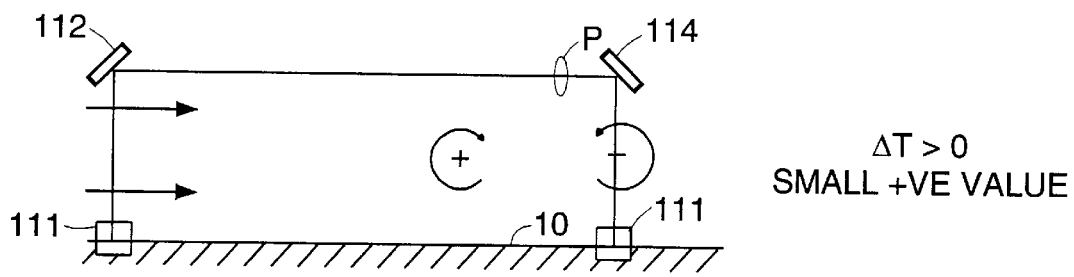
Figure 4C:
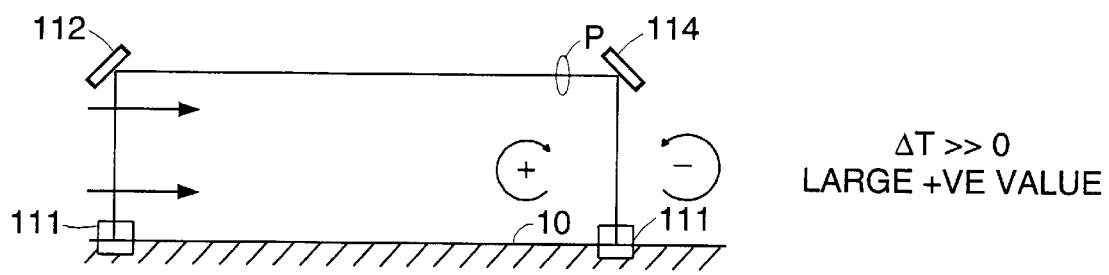

As shown in FIGS. 4A–4C, if a crosswind from the left side of the runway 10 to the right side of the runway is assumed, the difference in the transit times for the ultrasonic sound in each direction along path P will change with time. Specifically, while both vortices are still within the region R defined by path P. as shown in FIG. 4A, the total circulation is or near zero because the vortices in effect cancel each other out.

Figure 4D:
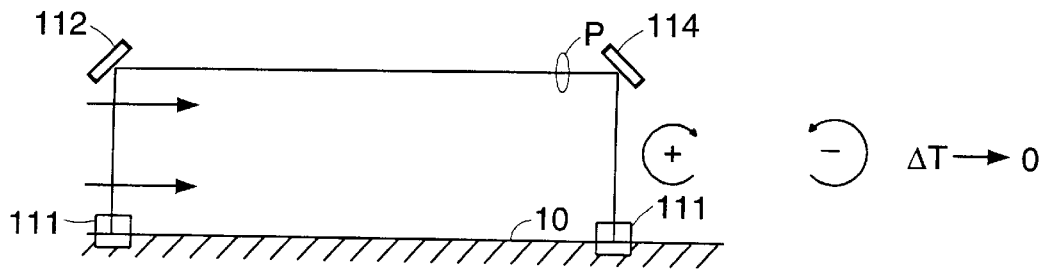

As the right vortex, spinning in the counterclockwise direction, begins to leave the region R, a difference in transit times in each direction will begin to be detected by system controller 130. This will become large as shown in FIG. 4C when the center of one of the vertexes has completely exited the region R and then will tend towards zero as both vortices leave the region R as shown in FIG. 4D.

FIG. 4E graphs the change in $\Delta t$, which is defined as the difference in the ultrasonic sound propagation time in each direction along path P. It peaks at time intervals corresponding to FIG. 4C when one of the vortices is within and the other is without the region R defined by the closed path. These results are compared to the expected vortex movement based on the wind direction data from sensor 115.

Figure 5:
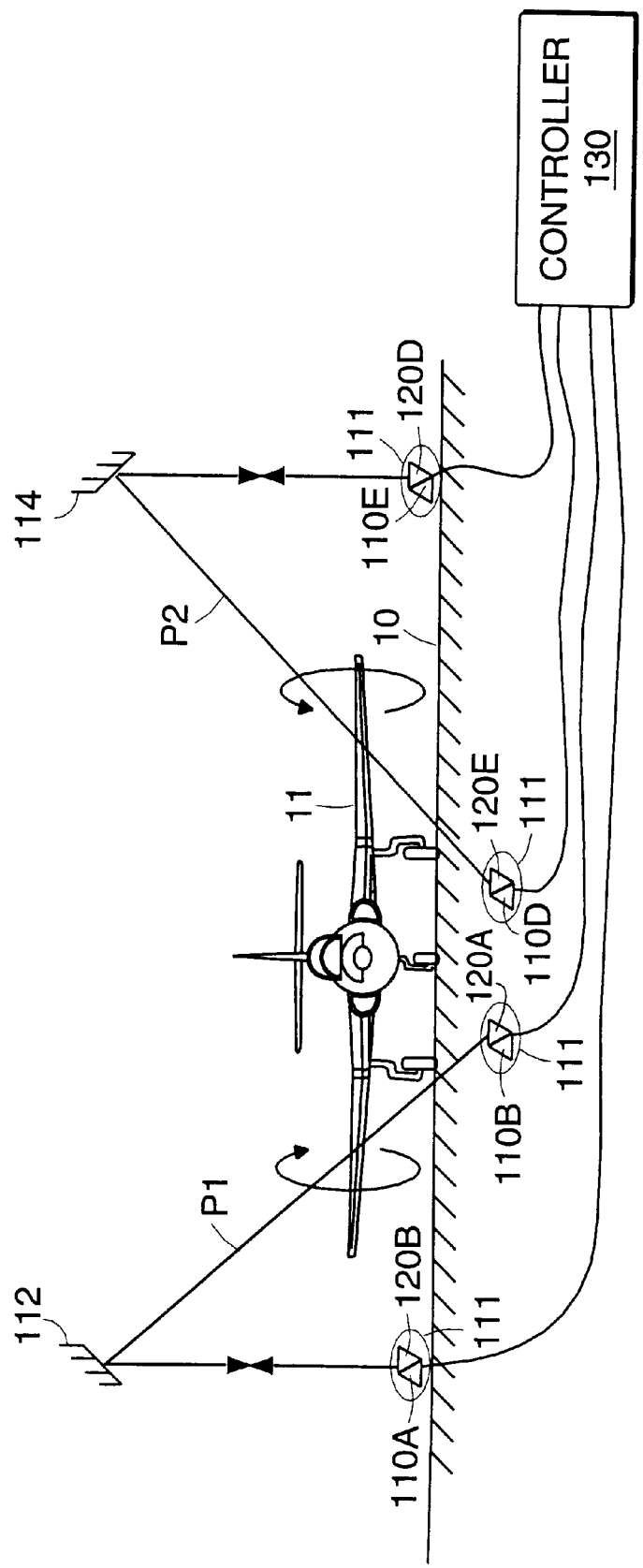
FIG. 5 is a schematic diagram illustrating a twin closed path embodiment of the inventive vortex detection system.

FIG. 5 shows another embodiment in which the system controller 130 detects the vortices using bidirectional ultrasonic signal propagation along two substantially closed paths, termed the twin closed path embodiment.

Specifically, a left closed path P1 is defined by two pairs of transducers, generators 110A, 110B, detectors 120A, 120B, and reflector 112. Specifically, generator 110A generates a signal detected by detector 120A and generator 110B generates a signal which is detected by detector 120B. This arrangement enables detection of the propagation times of the signals in both directions along path P1. Similarly, generators 110D, 110D, detectors 120D, 120E, and reflector 114 enable the controller 130 to determine the propagation times around path P2.

Figure 6A:
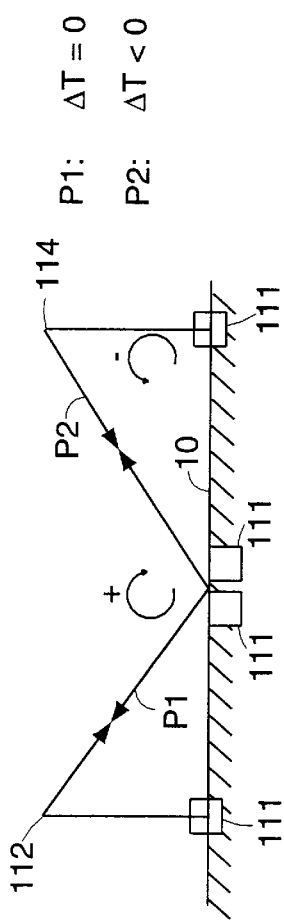
FIGS. 6A and 6B show the position of the vortices with a crosswind relative to the vortex detection system of FIG. 5.
Figure 6B:
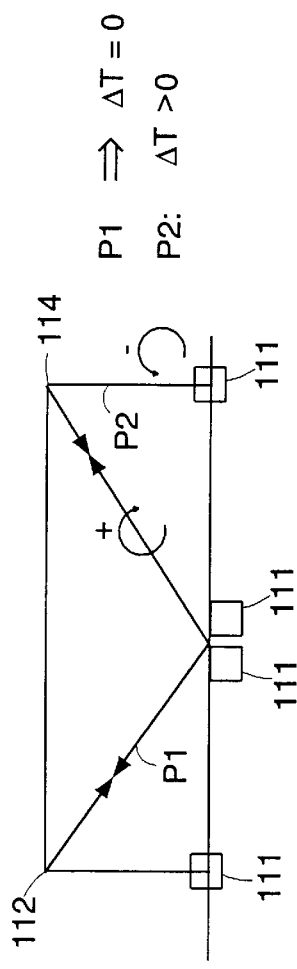

If a crosswind is assumed as shown in FIGS. 6A and 6B, the time difference $\Delta t$ measured by path P1 will peak and then slowly drop as the left vortex leaves the path P1. Path P2 will show large changes in the $\Delta t$ around the closed path as the counter-clockwise rotating vortex leaves the region of path P2 and the clockwise vortex enters the region of path P2.

Figure 6C:
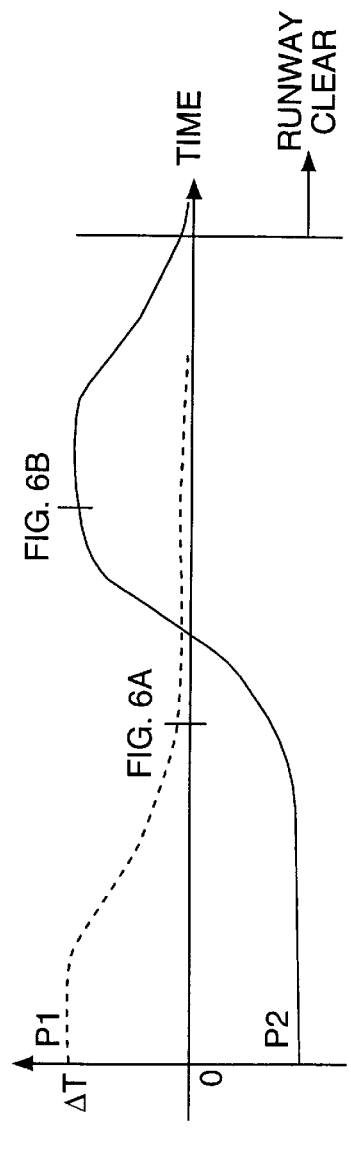
FIG. 6C is a plot of Δt as a function of time for each path of the vortex detection system of FIG. 5 with the crosswind shown in FIGS. 6A and 6B.

FIG. 6C is a plot of $\Delta t$ for paths P1 and P2 as a function of time showing the differences in the propagation times measured by the system controller 130. The resulting signature is used by the controller 130 to determine if the vortices have left the region of the runway 10, and thus allowing the controller to signal the next airplane that it is safe to take-off or land. Further information from a wind direction indicator is used in some embodiments to augment the information to the controller 130.

Figure 7:
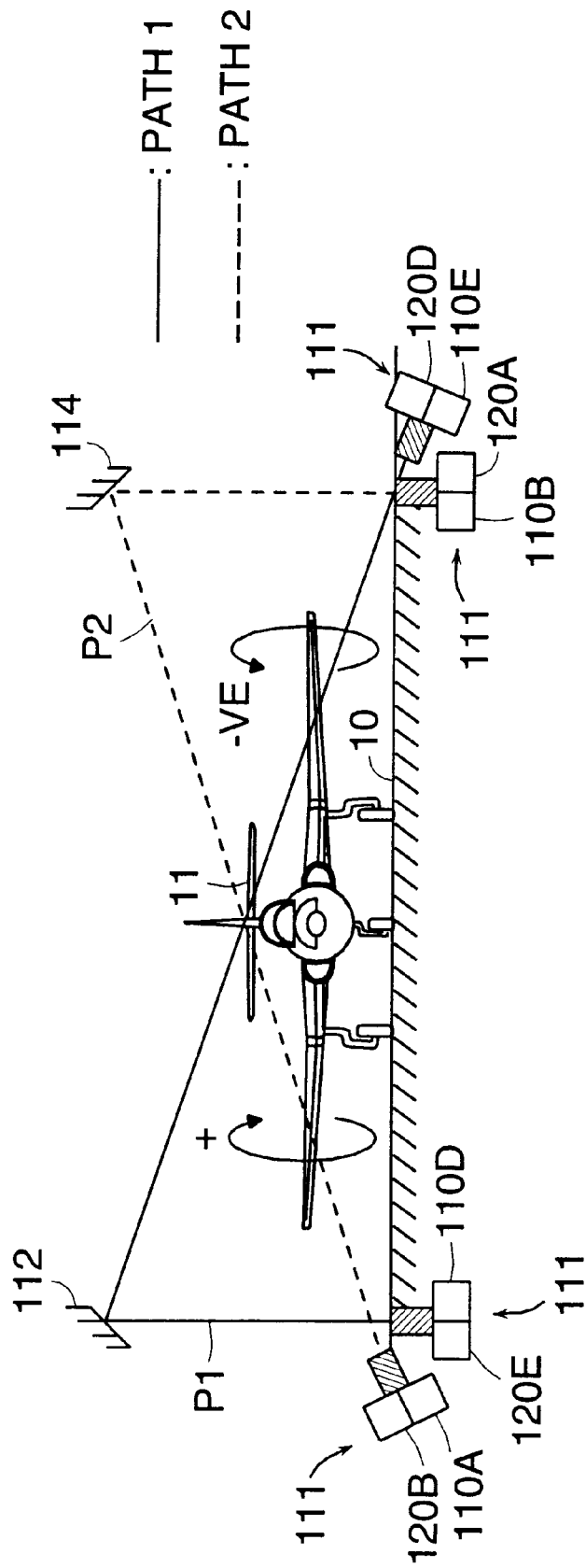
FIG. 7 is a schematic drawing showing a twin off-set closed path embodiment of the inventive vortex detection system.

FIG. 7 shows a twin offset closed path embodiment of the inventive vortex detection system. In this embodiment, two substantially closed paths P1, P2 are used, which overlap each other, each being triangular and extending across the runway 10. As before, generators 110A, 110B, detectors 120A, 120B, and reflector 112 are used to detect signal propagation times in both directions along path P1. Similarly, generators 110D, 110E, detectors 120D, 120E and reflector 114 enable the controller 130 to determine the propagation times around path P2

FIGS. 8A and 8B show the positions of the vortices relative to the paths P1 and P2 if a crosswind is assumed.

As shown in FIG. 8C, initially, the $\Delta t$ detected by each path are small but the $\Delta t$ detected by path P1 increases but then drops to zero as the left vortex remains within the region of the path P1 but the right vortex moves out of the path P1. The $\Delta t$ of path P2 increases gradually and peaks when the left vortex is within the path and the right vortex is without the path as shown in FIG. 8B.

Figure 9:
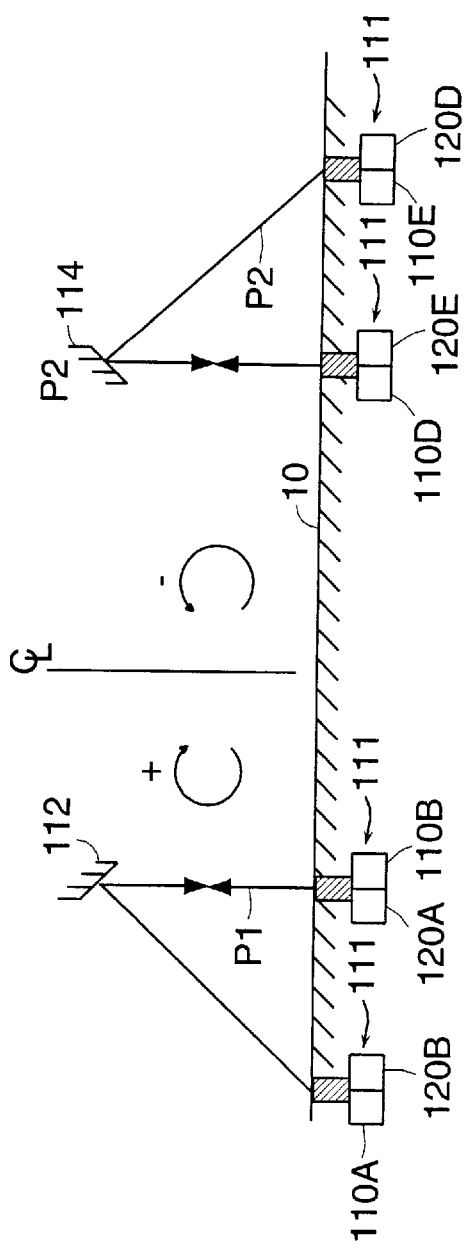
FIG. 9 is a schematic drawing showing a closed-path outside-the-runway embodiment of the inventive vortex detection system.

FIG. 9 shows an embodiment of the vortex detection system in which the regions defined by both closed paths P1 and P2 are outside the runway 10. Specifically, generators 110A, 110B, detectors 120A, 120B, along with reflector 112 detect $\Delta t$ for path P1, and generators 110D, 110E, detectors 120D, 120E, and reflector 114 detect $\Delta t$ for path P2.

Figure 10:
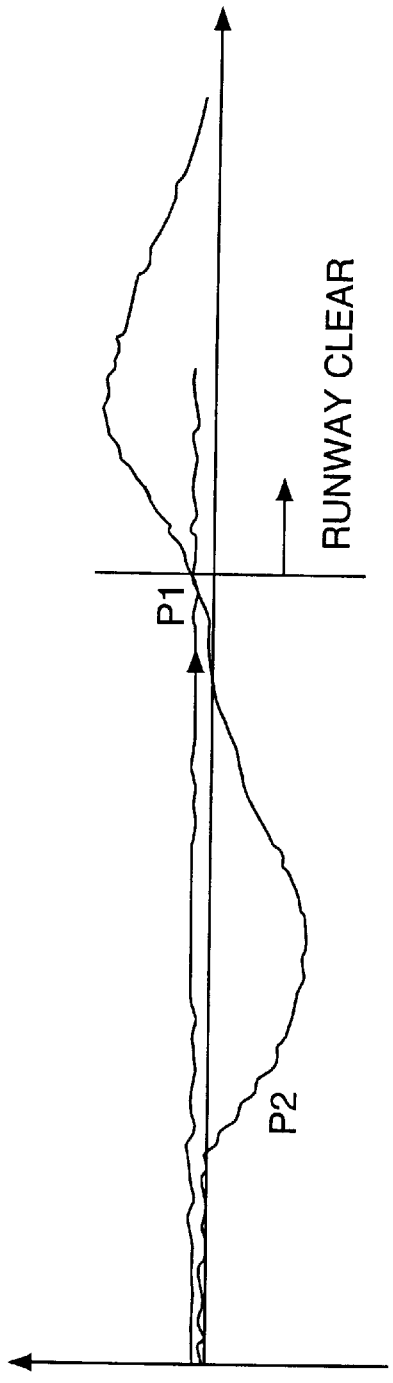
FIG. 10 is a graph of the Δt measured along paths P1 and P2 with a crosswind by the inventive vortex detection system of FIG. 9.

As shown in FIG. 10, the FIG. 9 embodiment has the disadvantage that it will not initially detect any vortices. Only as the vortices are blown into region P2 is a $\Delta t$ along the path of P2 detectable as the right and left vortices successively pass through the region of path P2.

Figure 11:
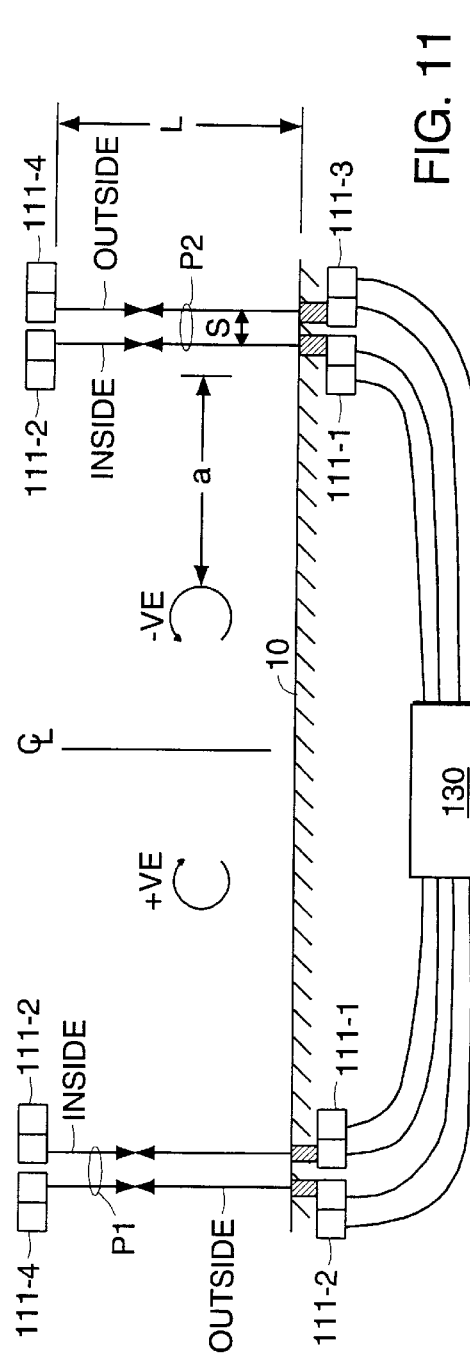
FIG. 11 is a dual path embodiment of the inventive vortex detection system in which two paths are located on either side of the runway.

FIG. 11 shows an arrangement in which four sets of transducers 111 are located on either side of the runway to establish four straight line bidirectional paths.

In this scheme two pairs of transducers 111-1, 111-3 are spaced a specific distance s (of the order of a few meters) apart at the level of the runway 10 and another two pairs of transducers 111-2, 111-4 are spaces a distance s apart above the runway over the first two pairs of transducers. Each pair comprises an ultrasonic generator and detector that transmits/receives in both up and down directions. By assuming a certain relationship for the decrease of the vortex tangential velocity, such as $v=\Gamma/2\pi r$ away from the vortex center, both the vortex center as well as its strength can be determined by this arrangement. Of course other tangential velocity profiles in the far field of the vortex can also be used provided that they match the observed data.

Case i, single pair of transducers: need to know: 1) distance between vortex center, a, and path between ①→②, L, i.e., distance between transducer pairs 111-1 and 111-2, inside of path P2:

If we assume $V_{vortex} = \dfrac{\Gamma}{2\Pi r}$ where $\Gamma$ is circulation and r is the radial distance from the vortex center.

Time of travel ① → ②  $T_{1\to2} = \dfrac{L}{c} - \dfrac{\Gamma a}{\pi c^2 A}\tan^{-1}\left(\dfrac{L}{2A}\right)$ where $c$ = local sound speed & $A^2 = a^2 + \dfrac{\Gamma a}{2\pi c}$ Time of travel ② → ①  $T_{2\to1} = \dfrac{L}{c} - \dfrac{\Gamma a}{\pi c^2 A}\tan^{-1}\left(\dfrac{L}{2A}\right)$ $\Delta T = T_{2\to1} - T_{1\to2} = \dfrac{2\Gamma a}{\pi c^2 A}\tan^{-1}\left(\dfrac{L}{2A}\right)$ or vortex circulation $\Gamma = \dfrac{\pi c^2}{2}(\Delta T)\left\{\dfrac{A/a}{\tan^{-1}(L/2A)}\right\}$ Therefore, need to know L, a, c, measure either $\Delta T$ or $T_{1\to2}$ $T_{2\leftarrow1}$ Assumed $V_{vortex} = \Gamma/2\pi r$
Case ii two pairs of transducers, a distance s, apart dual path approach.

If we assume $V_{vortex}$ is $\dfrac{\Gamma}{2\pi r}$ $T_{1\to2} = \dfrac{L}{c} - \dfrac{\Gamma a}{\pi c^2 a}\tan^{-1}\left(\dfrac{L}{2A}\right)$ where $A = \sqrt{a^2 + \Gamma a/2\pi c}$ or $\Delta T_{12} = T_{2\to1} - T_{1\to2} = \dfrac{2\Gamma a}{\pi c^2 a}\tan^{-1}\left(\dfrac{L}{2A}\right)$ but we don't know $a$.

In similar manner relative to transducer pairs 111-3 and 111-4 for outside path P2:

$T_{3\to4} =$ $\dfrac{L}{c} - \dfrac{\Gamma(a+s)}{\pi c^2 B}\tan^{-1}\left(\dfrac{L}{2B}\right)$ where $B = \left[(a+s)^2 + \dfrac{\Gamma(a+s)}{2\pi c}\right]^{1/2}$ $\Delta T_{34} = T_{4\to3} - T_{3\to4} = \dfrac{2\Gamma(a+s)}{\pi c^2 B}\tan^{-1}\left(\dfrac{L}{2B}\right)$ If we measure $\Delta T_{12}$ and $\Delta T_{34}$, we can calculate both $\Gamma$ and a. Note that s cannot be too small in comparison with a. If it is, then $\Delta T_{12}$ and $\Delta T_{34}$ become nearly identical. One can also use only $T_{1\to2}$ and $T_{3\to4}$ or any 2 relationships out of the four for $T_{1\to2}, T_{2\to1}, T_{3\to4}, T_{4\to3}$ to get both $\underline{\Gamma}$ and $\underline{a}$. But we expect using $\Delta T_{12}$ and $\Delta T_{34}$ to result in the most accurate data.

Figure 12:
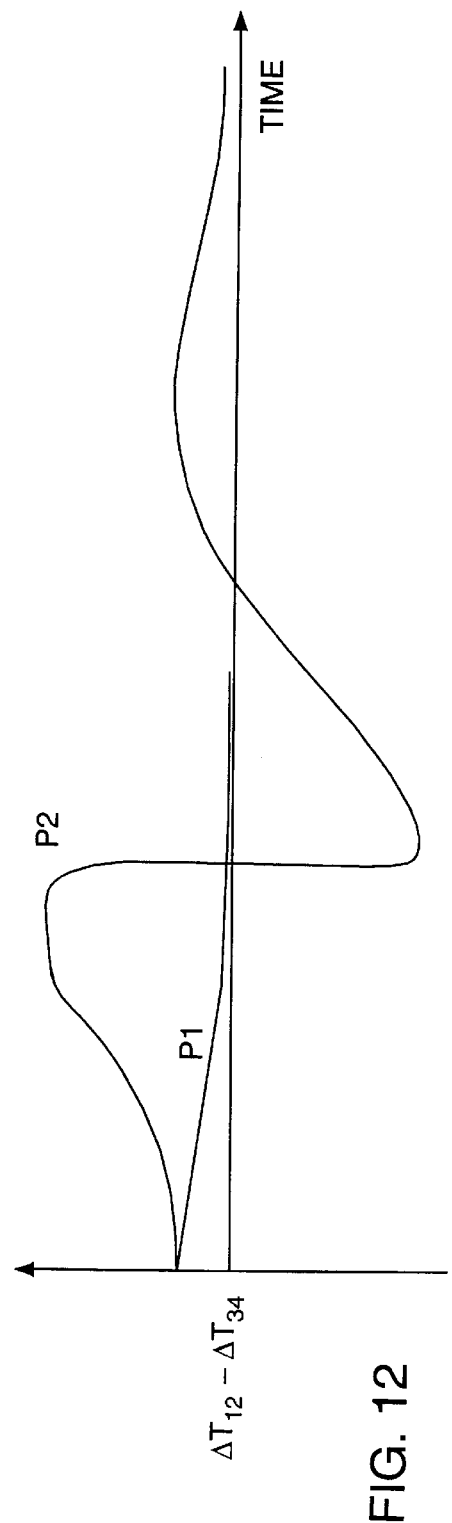
FIG. 12 shows the Δt measured between the inside and outside paths as a function of time for the vortex detection system of FIG. 11.

FIG. 12 shows the $(\Delta T_{12}-\Delta T_{34})$ for paths P1 (inside and outside) and $(\Delta T_{12}-\Delta T_{34})$ for paths P2 (inside and outside) as a function of time assuming a crosswind, from left to right in FIG. 11.

This embodiment supports the four bidirectional paths, two on each side of the runway. Separation between the transducers in each pair should not be too small otherwise interference for the difference between the two paths will be detectable. The time differences between the inside and outside paths for paths P1 slowly diminishes as the left vortex slowly moves away from the path. In contrast, for path P2, there is a positive peak as the right vortex moves through path P1 and then a negative peak as the left vortex moves through paths P2.

Lastly, the closed paths and the two-single path schemes may be combined where a single pole on each side of the runway can support the two single transmitters as well as the closed path reflector. This way the circulation obtained by the closed path can be compared against that found from the two single paths to verify the latter measurements.

While this invention has been particularly shown and described with references to preferred embodiments thereof, it will be understood by those skilled in the art that various changes in form and details may be made therein without departing from the spirit and scope of the invention as defined by the appended claims. For example, those skilled in the art will recognize or be able to ascertain using no more than routine experimentation, many equivalents to the specific embodiments of the invention described specifically herein. Further, it should be appreciated that a combined generator/sensor could be implemented is a single device. Such equivalents are intended to be encompassed in the scope of the claims.

What is claimed is:

1. A system for detecting airplane wake turbulence at a runway, the system comprising:
   at least one ultrasonic generator;
   at least one substantially closed path defined by at least one ultrasonic reflector surrounding a region possibly containing wake turbulence, around which ultrasonic signals from the at least one generator is transmitted;
   at least one ultrasonic detector that detects the ultrasonic signals traveling the closed path; and
   a system controller that predicts an existence of wake turbulence in the region in response to travel times for the ultrasonic signals over the closed path.

2. A system as described in claim 1, wherein the substantially closed path has a leg incorporating the runway.

3. A system as described in claim 1, wherein the ultrasonic generator and ultrasonic detector are nearly collocated to provide a closed path.

4. A system as described in claim 1, wherein the substantially closed path extends at least partially perpendicular to the runway.

5. A system as described in claim 1, wherein the substantially closed path encloses airspace above the runway.

6. A system as described in claim 1, further comprising at least two ultrasonic generators and ultrasonic detectors for transmitting the ultrasonic signals in both directions around the substantially closed path.

7. A system as described in claim 1, wherein one or multiple transducers are used that simultaneously function as the at least one ultrasonic generator and the at least one ultrasonic detector.

8. A system as described in claim 1, wherein the region is triangular with the at least one detector and generator being located at ground level and the reflector being located above the runway.

9. A system as described in claim 1, wherein an axis connecting the generator and detector extends at least partially transversely to a center line of the runway.

10. A system as described in claim 1, further comprising at least two substantially closed paths defined by at least two ultrasonic reflectors surrounding two regions, possibly containing wake turbulence, around which ultrasonic signals from generators are transmitted.

11. A system as described in claim 10, wherein the at least two substantially closed paths are centered on either side of the runway.

12. A system as described in claim 10, wherein the two regions both extend at least partially perpendicularly to the runway.

13. A system as described in claim 10, wherein the two regions are triangular with detectors and generators being located at ground level and reflectors being located above the runway.

14. A system as described in claim 13, wherein the reflectors are located on either side of the runway.

15. A system as described in claim 10, wherein the regions are overlapping.

16. A system as described in claim 1, further comprise a wind detector of detecting predominate wind direction.

17. A system for detecting airplane wake turbulence, comprising:

at least four ultrasonic transducers which generate and detect ultrasonic signals propagating in both directions along at least two paths spaced with respect to each other; and a system controller that controls the at least four ultrasonic signal transducers and predicts an existence of the wake turbulence in response to travel times for the ultrasonic signals over both directions of the at least two paths.

18. A system as described in claim 17, wherein the system controller determines a center of the wake turbulence in a region by reference to the travel times in both directions along both paths.

19. A system as described in claim 17, wherein the two paths are located on either side of a runway.

20. A system as described in claim 17, further comprising at least four paths, two paths on either side of a runway.

21. A system as described in claim 20, wherein the system controller determines a center of the wake turbulence in a region by reference to the travel times in both directions along both paths.

22. A method for detecting turbulence, the method comprising:

transmitting ultrasonic signals in both direction around a substantially closed path;

reflecting the ultrasonic signals using reflectors to establish the closed path;

determining travel times for the ultrasonic signals in both directions of the closed path; and comparing the travel times to predict an existence of turbulence in airspace enclosed by the path.

23. A method as described in claim 22, wherein in the airspace is above a runway.

24. A method as described in claim 22, wherein the airspace is near a structure.

25. A method as described in claim 22, wherein the airspace is near a vehicle.

26. A method as described in claim 22, wherein the substantially closed path has a leg incorporating a runway.

27. A method as described in claim 22, wherein the substantially closed path extends at least partially perpendicular to a runway.

28. A method as described in claim 22, wherein the substantially closed path encloses airspace above a runway.

29. A method as described in claim 22, further comprising transmitting the ultrasonic signals in both directions around at least two substantially closed paths defined by at least two ultrasonic reflectors.

30. A method as described in claim 29, further comprising centering the at least two substantially closed paths on either side of a runway.

31. A method for detecting airplane wake turbulence, comprising:

transmitting ultrasonic signals in both directions along at least two paths spaced with respect to each other; and predicting an existence and location of the wake turbulence in response to travel times for the ultrasonic signals over both directions of the two paths.

32. A method as described in claim 31, further comprising determining a center of the wake turbulence in a region by reference to the travel times in both directions along both paths.

33. A method as described in claim 31, further comprising locating the two paths on either side of a runway.

34. A system as described in claim 1, wherein the at least one ultrasonic reflector is mounted above the runway on a pole.

35. A method as described in claim 22, further comprising the step of mounting the reflector above the runway on a pole.

36. A system as described in claim 1, wherein the travel times of the ultrasonic signals traveling over multiple legs of the closed path are integrated to predict an existence of wake turbulence.

37. A method as described in claim 22, further comprising the step of integrating the travel times of the ultrasonic signals over multiple legs of the closed path to predict an existence of wake turbulence.

* * * * *